United States Patent Office 3,222,323
Patented Dec. 7, 1965

---

3,222,323
CARBOXY ETHYLENE KETO POLYMERS
Frederick C. Leavitt, Framingham, Mass., assignor to The Dow Chemical Company, Midland, Mich., a corporation of Delaware
No Drawing. Filed June 27, 1962, Ser. No. 205,554
33 Claims. (Cl. 260—78.4)

This invention relates to carboxy ethylene keto polymers and a process for the preparation thereof. More specifically it relates to carboxy vinylidene keto and carboxy vinylene keto polymers prepared by the acylation of alkenyl aromatic polymers, such as polystyrene, with maleic anhydride and related unsaturated anhydrides to produce acylation products in which only one of the acid groups of the anhydride is attached to the polymer.

Linear polymers of alkenyl aromatic compounds such as styrene and various related compounds have been sought which contain post-reactive groups which can be activated to effect crosslinking and thermo setting after the linear polymer has been molded or otherwise shaped. However, such post-reactive groups should be of sufficient stability as not to crosslink during the formation of the polymer nor to act prematurely either before or during the shaping or forming operation.

Numerous attempts have been made to attach such post-reactive groups to a monomer with the hope that such groups would be not reacted during the formation of the linear polymers, and thereby be available for post-reaction after the shaping or forming of the linear polymer. However, for one reason or another, these attempts have not been sufficiently effective or feasible to make them commercially attractive. In some cases, the post-reactive group undergoes polymerization simultaneously with the formation of the linear polymer. In other cases, the post-reactive group may be modified or reacted or rendered nonreactive during the polymerization or subsequent treatment. In still other cases, the post-reactive group deteriorates or reacts during the molding or shaping operation or during storage.

U.S. Patent 2,500,082 describes a method for acylating styrene copolymers such as styrene-isobutylene copolymers, etc., with an acylating agent of the formula $R(COX)_n$ wherein X is halogen and n is an integer of 1 to 3, with the R group described as preferably derived from fatty acids in which the R radical comprises five or more carbon atoms. Reference is also made to such acid halides as derived from maleic, succinic, adipic and related dibasic acids.

However, such dihalides result in the production of crosslinked polymers as pointed out in column 4, lines 21–25, where it is stated: ". . . having two or more copolymer molecules interlinked by means of the acylating agent in case a dibasic acylating agent is used such as phthalyl chloride, sebacyl chloride and the like." When such crosslinking occurs, the product loses its formable character and therefore cannot be shaped. Furthermore, the ethylenic group in an unsaturated dichloride such as maleyl chloride is buried when the two acid groups are attached to polymer molecules. In any case, any possibilities of having a post-reactive group is defeated when the acylation is carried out as taught by this patent.

In accordance with the present invention, it has now been found that polymeric alkenyl aromatic molecules can be acylated in the presence of $AlCl_3$ by anhydrides of certain unsaturated dibasic acids, such as maleic, etc., to give polymer products wherein only one of the acid radicals is acylated to the polymer molecules thereby leaving the second acid radical available for possible conversion to form derivatives, and also leaving the unsaturated group available for various reactions, including the crosslinking of polymer molecules.

Such mono-acylation derivatives of linear polymers are therefore still capable of being shaped or formed with the second acid group available for various post-reactions, and the unsaturated group is also available for crosslinking or for the addition of various groups. For example, heating with or without polymerization catalysts, such as peroxy or azo compounds, will effect further polymerization or curing of the polymer to infusible and insoluble forms. Furthermore, the linear polymer can be treated with halogens, such as chlorine, bromine, etc., so as to have the halogen added to the double bond and if desired to the acid group, so as to impart fire-retardant properties to the polymer. The acid halide thus formed can also be used to effect acylation of the second group upon heating of the polymer after it has been shaped. Likewise, the acid group can be esterified and the ethylenic group polymerized or cured.

In addition to the maleic anhydride mentioned above, other unsaturated anhydrides of dibasic acids can be used including α-chloro and α-bromo-maleic anhydride, α-methyl maleic (citraconic) anhydride, itaconic anhydride and glutaconic anhydride. Maleic acid and its α-derivatives can be represented by the formula $$HOOC-C(R)=C(R)-COOH$$

wherein at least one R group is hydrogen and the other R is hydrogen or a methyl, chloro or bromo radical. Itaconic and glutaconic acids can be represented by the formula $R'-CH=CH(R')-COOH$, wherein one $R'$ is hydrogen and the other one is a $CH_2-COOH$ group.

When maleic anhydride is used as the acylating agent, the resultant radical attached to the aromatic nucleus of the polymer has the formula $-C(O)-CH=CH-COOH$.

When citraconic anhydride is the acylating agent, the resulting pendant group has either the formula $-C(O)-CH=C(CH_3)-COOH$ or
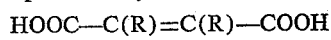

and generally both types of these radicals are present, the relative proportions depending on reaction conditions and the relative selectivity of the two carboxy radicals in the anhydride.

Likewise, when α-chloromaleic and α-bromomaleic anhydrides are the acylating agents, the resultant pendant groups are $-C(O)-C(Cl)=CH-COOH$ and $-C(O)-CH=C(Cl)-COOH$ and $-C(O)-C(Br)=CH-COOH$ and $-C(O)-CH=C(Br)-COOH$ respectively.

When itaconic anhydride is the acylating agent, the pendant radical has either the formula

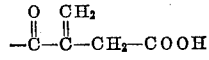

or

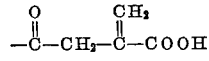

When glutaconic anhydride is the acylating agent, the resultant pendant radical has either the formula $-C(O)-CH=CH-CH_2-COOH$ or
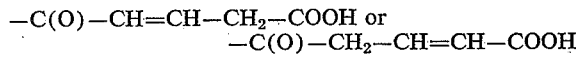

As indicated above, where two formulas are possible for the pendant group resulting from the particular anhydride, radicals of both formulas are generally present and the relative proportion depends on the reaction conditions and the particular selectivity of one acid group over the other in the particular anhydride.

The alkenyl aromatic preformed polymers used as the starting material for attachment of the above pendant groups by the acylation described herein are represented by the formula $$CH_2=C(R'')-Ar$$

wherein R'' represents hydrogen, and lower alkyl groups preferably methyl, ethyl, etc. Therefore, the starting polymer has a plurality of repeating units therein of the formula

After the acylation, the resultant polymer has a number of such repeating units converted to repeating units of one or more of the following formulas depending on the particular anhydride or anhydrides used in the acylation, wherein Ar' is the same as Ar except that it has one greater valency by virtue of the attached acyl group.

Thus, a repeating unit derived by acylation with maleic anhydride has the formula

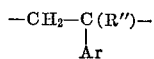

The repeating unit derived by the acylation with citraconic anhydride has either the formula

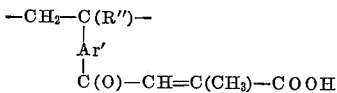

or

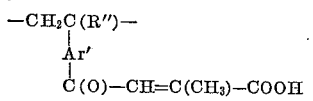

The repeating unit derived by acylation with α-chloromaleic has either the formula

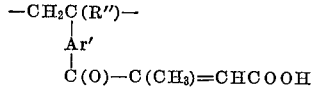

or

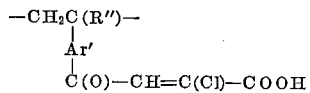

The repeating unit derived by acylation with α-bromomaleic has either the formula

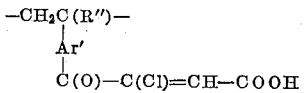

or

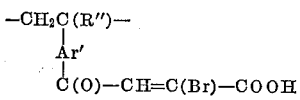

The repeating unit derived by acylation with itaconic anhydride has either the formula

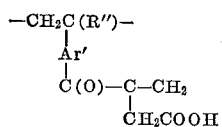

or

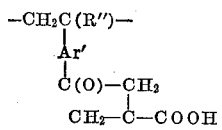

The repeating unit derived by acylation with glutaconic anhydride has either the formula

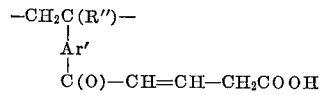

or

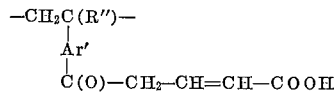

Polystyrene is preferred in the practice of this invention, but other polymers of alkenyl aromatic compounds can be used, preferably those in which the aromatic ring has no substitution or a small amount of substitution, in addition to the alkenyl group. Other substituents on the aromatic ring can include, but are not limited to, various aliphatic, cycloaliphatic and aromatic hydrocarbon groups, preferably of no more than about 8 carbon atoms, halogen, eg., Cl, F, Br and I, etc.

Typical alkenyl aromatic compounds that can be used include, but are not restricted to, polymers of the following: styrene, alphamethylstyrene, alphaethylstyrene, various derivatives of styrene having the substituent groups attached to the aromatic nucleus, such as, methyl styrene, ethyl styrene, propyl styrene, butyl styrene, heptyl styrene, octyl styrene, and the corresponding derivatives of alphamethylstyrene, alphaethylstyrene, etc., chloro styrene, cyanomethyl styrene, etc., preferably with the nuclear substituent group of the preceding compounds in a position other than para to the alkenyl group, vinyl naphthalene, isopropenyl naphthalene, vinyl methyl naphthalene, vinyl ethyl naphthalene, vinyl dimethyl naphthalene, vinyl hexyl naphthalene, vinyl diethyl naphthalene, isopropenyl diphenyl, vinyl methyl diphenyl, vinyl butyl diphenyl, vinyl chloro naphthalene, vinyl cyano naphthalene, vinyl cyanoethyl naphthalene, isopropenyl bromo naphthalene, vinyl chloro diphenyl, isopropenyl cyano diphenyl, isopropenyl fluoro diphenyl, etc.

As indicated above, various copolymers of alkenyl aromatic compounds are also included for use in the practice of this invention. In such cases it is desirable to have at least 5% of the alkenyl aromatic monomer contained in the copolymer so as to provide sufficient aromatic nuclei which can be acylated to provide a desired amount of cross-linking groups, preferably at least 20%, particularly where the comonomer may have substituents therein which retard or interfere with the acylation. In some cases it may be desirable to use copolymers of one alkenyl aromatic group having no substituents or no more than one substituent on the aromatic nucleus, and as the comonomer an alkenyl aromatic monomer having a high degree of substitution thereon, in which case the latter monomer does not have positions easily available for acylation. In such case it is desirable to use copolymers of monomer mixtures having at least 5% of the unsubstituted or substituted alkenyl aromatic compound having one substitutent group other than the alkenyl group.

Generally, however, it is preferred to use at least 20% of an alkenyl aromatic compound having a number of positions available for acylation even though it is not intended, or possibly desired, to substitute an acyl group on each of such nuclei.

In addition to various alkenyl aromatic compounds having a high degree of substitution thereon of the groups indicated above, it is also desirable in many cases to use other modifying comonomers in conjunction with the unsubstituted or monosubstituted alkenyl aromatic compounds. Preferred comonomers are those which are not reactive with or recated on by the $AlCl_3$. Typical preferred comonomers, in addition to the various alkenyl aryl compounds listed above are ethylene, propylene, butenes, butadiene, isoprene, vinyl ethyl ether, acrylonitrile, methyl methacrylate, etc.

Advantageously, the polymers used as starting materials in the practice of this invention are solid at room temperature. Molecular weights of no less than 3000 are generally preferred, although in some cases where a high degree of acylation is to be effected with the result that the molecular weight will be multiplied considerably upon cross-linking, even a lower molecular weight can often be used. There is no upper limit on the molecular weight of the polymers that can be used. With higher molecular weights such as 150,000 or higher, the number of acyl groups to be introduced to produce insolubility and infusibility upon crosslinking, is obviously much smaller than is the case where lower molecular weight polymers are used.

Since the polymer starting material is generally a solid, it is desirable to use a solvent to provide more intimate contact between the reagents, and also to provide a medium which will retain the by-products or unreacted reagents after the polymer product is precipitated therefrom. Obviously the solvent selected is one which is non-reactive with the $AlCl_3$. Typical solvents suitable for this purpose are methylene chloride, ethylene chloride, chlorobenzene, carbon disulfide, nitrobenzene, etc.

Conditions for effecting the acylation are selected to minimize the premature crosslinking of the product and also to minimize polymerization of the unsaturated acylating reagent. These conditions will vary according to the reactivity of the particular acylating compound and the particular substituent group attached. With the more reactive unsaturated acyl groups, generally temperatures below 80° C. are advantageous, preferably 0° to 40° C. The preferred temperature will be determined also according to the degree of acyl substitution to be effected, the particular solvent being used, the concentrations of polymer and of modifiers, etc. Lower temperatures aid in HCl retention in the solution which results in a certain amount of HCl addition to the double bonds, and therefore are undesirable.

Since water catalyzes or promotes HCl addition to the double bond, this is most easily avoided by keeping the reaction mass anhydrous. However, quick removal of HCl by application of vacuum is also useful for this purpose.

The proportion of $AlCl_3$ to be used is based upon the amount or number of acylating groups to be attached. Obviously, however, if less than a mole per mole basis of $AlCl_3$ is used, the degree of acylation effected will be in accordance with the amount of catalyst used. While acylation can be effected with as little as 0.1 mole of $AlCl_3$ per mole of acylating agent, it is generally preferred to use 2 moles or even a slight excess of $AlCl_3$ per mole of anhydride. Generally, however, there is no purpose in using more than 3 moles of $AlCl_3$ per mole of anhydride.

The proportion of acylating agent to be used depends on the degree of substitution desired in the resultant polymeric product. Generally, however, about 5–15% substitution on the basis of unsaturated keto groups per aromatic nuclei is sufficient for most purposes. Nevertheless, improvements are noted with as little as .01% substitution. It is generally desirable not to exceed 20% substitution where only aromatic monomers are used in the polymers. Exceeding this degree of substitution introduces more sites for crosslinking which makes more difficult the control of crosslinking during preparation. However, where the aromatic component of a copolymer represents a very small proportion of the total copolymer, the aromatic nuclei acylated can be much greater on a percentage basis, in which case the number of unsaturated keto groups advantageously does not exceed about 25% on the basis of the weight of the entire copolymer.

The invention is best illustrated by the following examples. These examples are given merely for illustrative purposes and it is not intended that the scope of the invention or the manner in which it can be practiced will be in any way limited by these examples. Unless specifically provided otherwise, reference to parts and percentages in these examples and throughout the specification are to parts and percentages by weight.

Example I

In a reactor equipped with a stirrer, a solution of 25 parts of a polystyrene resin in 250 parts of methylene chloride is added. The polystyrene resin has a low molecular weight as evidenced by an absolute viscosity of 2 centipoises determined on a 10% by weight solution in toluene at 25° C. To this resin-methylene chloride solution is added slowly 3 parts of maleic anhydride. Then at room temperature and with simultaneous, vigorous stirring, there is added 9 parts of anhydrous $AlCl_3$ powder. Stirring is continued for about 3 hours after the $AlCl_3$ addition is completed. The solution is then poured onto a dilute HCl-ice mixture having a combined volume of approximately three times that of the reaction mixture and having sufficient ice therein to occupy approximately the same volume as the dilute acid. After separation of the precipitated polymer product, infrared analysis shows that there are approximately 2 of the keto groups substituted per 100 aromatic nuclei on a molar basis. The physical properties resemble those of the starting polymer. However, upon heating, the product is crosslinked with accompanying increasing insolubility and increased melting point until the material becomes sufficiently crosslinked to produce infusibility.

Example II

In this example a polystyrene of high molecular weight is used as evidenced by an absolute viscosity of 25 as determined on a 10% by weight solution in toluene at 25° C.

The procedure of Example I is repeated using 4 parts of polystyrene in 200 parts of chlorobenzene, 0.5 part of maleic anhydride, and 1.5 parts of anhydrous $AlCl_3$ powder. The resultant mixture is stirred vigorously at 35° C. for 2.5 hours. After precipitation and separation of the resultant polymer, infra-red analysis shows an unsaturated keto substitution of approximately 3% on an aromatic nuclei molar basis. This polymer product is soluble in a 50–50 benzene-acetone mixture but upon heating becomes cross-linked and reaches insolubility and infusibility much quicker than the product of Example I.

Example III

The procedure of Example II is repeated a number of times using similar amounts of polymers of approximately similar molecular weights of vinyl toluene, alpha methyl styrene, vinyl naphthalene, and vinyl diphenyl, respectively. Similar results are obtained, and upon heating the resultant polymers, effective cross-linking results.

Example IV

The procedure of Example II is repeated a number of times using equivalent amounts of the various polymers indicated in Table A below, in place of the polystyrene, using 200 parts of chlorobenzene, and using the respective acylating agents shown. In each case, the unsaturated keto groups are effectively substituted and satisfactory cross-linking effected upon heating.

TABLE A

| Polymer of— | Parts | Anhydride | Parts |
|---|---|---|---|
| Styrene | 4 | Itaconic | 0.65 |
| Vinyl Toluene | 4.6 | Citraconic | 0.7 |
| α-Me Styrene | 4.6 | α-Cl-Maleic | 0.9 |
| ar-Ethyl Vinyl Naphthalene | 7 | α-Br-Maleic | 1.2 |
| Vinyl Diphenyl | 7 | Glutaconic | 0.8 |
| Styrene | 5.3 | Citraconic | 0.8 |
| Styrene | 7.2 | Glutaconic | 0.8 |
| o-Cl-Styrene | 4 | o-Cl-Maleic | 0.9 |

Example V

The procedure of Example IV is repeated a number of times with similar results using the combinations and proportions of copolymer and anhydride shown in Table B. The numbers before each comonomer represent the amount of that comonomer in 100 parts of the indicated copolymer.

TABLE B

| Copolymer of— | Parts | Anhydride | Parts |
|---|---|---|---|
| 70 Styrene, 30 Butadiene | 5 | Maleic | 0.6 |
| 70 Styrene, 30 Ethylene | 4 | Itaconic | 0.4 |
| 60 Vinyl Toluene, 40 Propylene | 5 | Citraconic | 0.7 |
| 75 Styrene, 25 Acrylonitrile | 5 | α-Cl-Maleic | 0.8 |
| 75 Styrene, 25 Vinyl Cyclohexane | 4 | α-Br-Maleic | 1.2 |
| 90 Styrene, 10 Vinyl Ethyl Ether | 4 | Glutaconic | 0.9 |
| 80 Vinyl Naphthalene, 20 Isoprene | 5 | Maleic | 0.7 |
| 50 Styrene, 50 α-Me-Styrene | 4 | Maleic | 0.7 |
| 50 Styrene, 50 α-Me-Styrene | 4 | Maleic | 0.7 |

Example VI

The procedure of Example II is repeated with similar degree of unsaturated keto substitution using in place of the polystyrene of that example an isotactic amorphous polystyrene of about 100,000 molecular weight prepared by use of a heterogeneous catalyst system of the Ziegler type using $TiCl_4$ and Al triisobutyl.

Example VII

The procedure of Example II is repeated using a solution of 2 parts of the polymer in 100 parts of carbon disulfide, with 0.16 part of maleic anhydride being added. Anhydrous $AlCl_3$ powder (0.5 part) is added slowly with vigorous agitation. The reaction is allowed to proceed at room temperature and ambient temperatures for 3 hours. The reaction mass is then hydrolyzed and recovered as in Example I. Infrared analysis indicates a degree of substitution of approximately 2 unsaturated keto groups per 100 styrene nuclei. The polymer is soluble in a 50–50 mixture of benzene and acetone. However, when the dried polymer is exposed to ordinary daylight at room temperature it becomes insolubilized within two hours.

In addition to producing crosslinking by heating, the polymer products of this invention also can be crosslinked by various other methods including exposure to ultraviolet and ionizing radiation. Moreover, the products of this invention can be used for various purposes other than crosslinking and reacted in various other ways. For example, bromine can be added to the double bond of the unsaturated keto group so as to improve the fire retardant properties. The following examples illustrate some of these reactions.

Example VIII 1 part of the vinyl keto polystyrene of Example I is dissolved in 100 parts of $CCl_4$. Then 2 parts of a 1% bromine in $CCl_4$ solution is added, and the mixture stirred for 3 hours. The resultant polymer product is precipitated by pouring the reaction mixture into methanol. The precipitated polymer is reprecipitated twice by dissolving in benzene and precipitating in methanol. Analysis shows approximately theoretical bromine value for the amount of unsaturation in the starting polymer.

The unsaturated keto polymers can be incorporated in various drying oils, unsaturated polyester resins, plastisol formulations, polymerizable monomer compositions, etc., to hasten setting times and give improved products. For example, a 2% solution of the unsaturated keto polymer of Example II in styrene monomer was completely gelled within an hour when heated at 60° C. with a small amount of azoisobutyronitrile. Heating styrene monomer under similar conditions without the unsaturated keto polymer yielded a mobile solution containing less than 10% polymer.

As indicated above, the repeating unit structure of the alkenyl aromatic starting polymer is $$-CH_2C(R'')-\underset{Ar}{|}$$

After the acylation the polymers contain a plurality of repeating units having one of the formulas

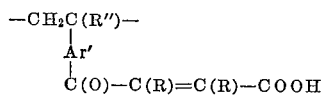

as derived from maleic, citraconic, α-chloromaleic or α-bromomaleic anhydride; or

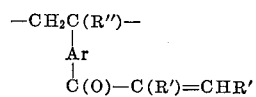

or

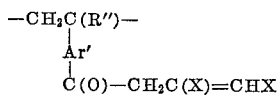

as derived from itaconic or glutaconic anhydride. In these formulas, R represents hydrogen, methyl, chlorine or bromine; one R' represents hydrogen and the other the —$CH_2COOH$ radical; R'' represents hydrogen or a lower alkyl radical, preferably methyl or ethyl; one X represents hydrogen and the other represents the —COOH radical; Ar represents an aromatic nucleus as illustrated above in the various illustrative compounds listed, preferably phenyl, naphthyl and diphenyl radicals and various derivatives thereof having at least four nuclear positions free for substitution; and Ar' represents an aromatic nucleus similar to those defined for Ar except that it has one greater valency due to the substitution of the acyl group thereon.

Unless indicated otherwise, the terms "polymer" and "polymeric," as used herein, include both homopolymers and heteropolymers.

Specific polymers prepared according to the above examples have a plurality of repeating units therein of the following formulas, respectively, in molar proportions, corresponding to the degree of substitution.

In Example I and II the polymer products each have the repeating $$-CH_2CH-\underset{C_6H_5}{|}$$

as in the starting polymer, and also the acylated repeating unit $$-CH_2CH-$$
$$|$$
$$C_6H_4$$
$$|$$
$$O=C-CH=CH-COOH$$

In Example III, the polymer products have the following respective combinations of repeating units;

(a) —CH₂CH—        —CH₂CH—
    |               |
    C₆H₄—CH₃   and  C₆H₃CH₃
                    |
                    O=C—CH=CH—COOH (b) —CH₂C(CH₃)—       —CH₂C(CH₃)—
    |               and   |
    C₆H₅                C₆H₄
                        |
                        O=C—CH=CH—COOH (c) —CH₂CH—        —CH₂CH—
    |               |
    C₁₀H₇      and  C₁₀H₆
                    |
                    O=C—CH=CH—COOH (d) —CH₂CH—        —CH₂CH—
    |               |
    C₆H₄C₆C₅   and  C₁₂H₉
                    |
                    O=C—CH=CH—COOH In Example IV, the first five polymer products have the following respective combinations of repeating units:

(a) 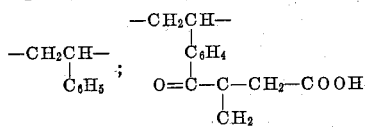

and

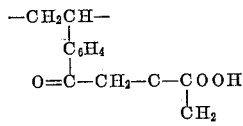

(b) 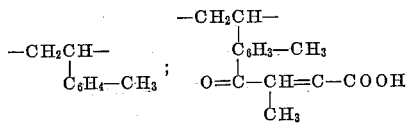

and

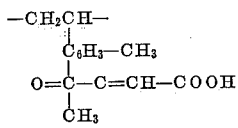

(c) 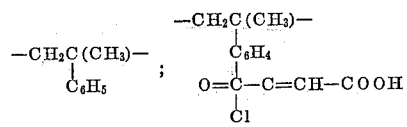

and

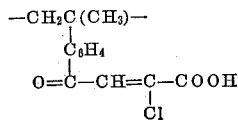

(d) 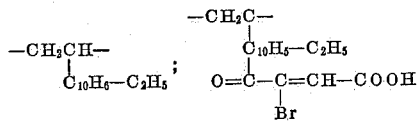

and

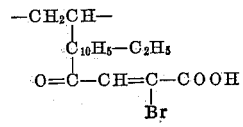

(e) 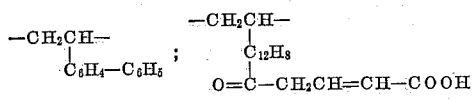

and

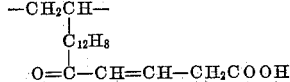

As indicated above, the unsaturated keto polymers of this invention can be incorporated into drying oils, polyester (unsaturated) type resins, plastisol formulations, etc., to reduce greatly the time for setting and also to give improved products. They are also useful in the preparation of ion exchange resins.

One particularly valuable utility for the resins of this invention is in the preparation of casting resins wherein the unsaturated keto polymer is used in place of the unsaturated polyester resin normally used for this purpose, such as derived from ethylene glycol and maleic anhydride, propylene glycol fumaryl phthalate, etc. With these unsaturated polyester resins, comonomers such as styrene and other monovinyl compounds are added to cause setting or crosslinking through the unsaturation in the polyester resin. The unsaturated keto polymers of this invention have been found to be excellent replacements for the unsaturated polyester resins and also to give reduced setting times as well as improved properties in the resultant cast resins. As comonomers in this type of casting resin, the same type of monovinyl compounds can be used as are presently used with the unsaturated polyester resins. These are vinyl and vinylidene compounds defined as having $CH_2=CH-$ and $CH_2=C<$ groups respectively. Particularly preferred, however, are styrene and the various other vinyl aromatic compounds listed above as suitable for the preparation of the preformed polymer starting materials used in the practice of this invention. In addition, various other non-aromatic comonomers can be used such as vinyl acetate, vinyl chloride, vinylidene chloride, acrylonitrile, methyl methacrylate, methyl acrylate, etc.

The substitutions of the unsaturated keto polymers for the polyesters gives much more versatility in the nature of the resultant structure because both the degree of substitution and the polymeric backbone can be varied, and much higher molecular weights are possible. In addition, a much lower percentage of the vinyl keto polymer can be used to obtain equivalent physical properties. Improved heat distortion, inflammability, etc. are also obtained, in accordance with the type of vinyl keto polymer employed.

In producing such cast resins, the various types of catalysts presently used for such purposes can be employed, such as free radical-generating catalysts, e.g. peroxy and azo catalysts. Typical examples of these are benzoyl peroxide, t-butyl hydroperoxide, t-butyl perbenzoate, lauroyl peroxide, di-t-butyl perphthalate, $\gamma',\gamma'$-azodiisobutyronitrile; dimethyl azodiisobutyrate, etc.

The following example illustrates a typical procedure for producing cast resins by this method, and also the excellent results obtained.

*Example IX*

Two samples are prepared using six parts of styrene and four parts of an unsaturated keto polystyrene prepared according to Example I, the first having a degree of substitution of 4 and a second a degree of substitution of 10, with 0.5% of benzoyl peroxide added to each sample. Each sample is sealed under an inert atmosphere and heated at 80° C. for 2 hours. The conversion of monomer to polymer is complete and the resultant products have the physical properties listed in the table immediately below.

| D.S. | Flex Strength | Flex Modulus | Heat Distortion, ° C. | Izod Impact, lbs. |
| --- | --- | --- | --- | --- |
| 4 | 13,600 | 4.3 | 92 | 1.2 |
| 10.0 | 13,500 | 4.4 | 95 | 1.7 |

Similar improved results are obtained when vinyl toluene, chloro styrene, ethyl sytrene, vinyl naphthalene, vinyl diphenyl, are substituted respectively for the styrene monomer. In some cases, such as with vinyl toluene and chloro styrene, the great polymerization tendencies of such compounds effect even faster setting of the casting resin than is the case with styrene.

Similar improved results are also obtained when various other polyalkenyl aromatic polymers of Examples II–VII having varying degrees of substitution of unsaturated keto groups are substituted for the polymers used in Example IX.

The unsaturated keto polymeric derivatives of this invention also undergo reaction by the addition of primary and secondary amines, mercaptans, primary and secondary alcohols, amino acids, etc. Postcuring can be effected by first reacting aminoalcohols and then subsequently curing through the pendant hydroxy groups by

The invention claimed is:

1. The process for preparing a carboxy ethylene keto derivative of an alkenyl aromatic polymer comprising the step of acylating a preformed polymer of an alkenyl aromatic compound of the formula $CH_2=C(R'')-Ar$ wherein R'' is a radical selected from the class consisting of hydrogen, methyl and ethyl radicals; Ar is an aromatic group selected from the class consisting of phenyl and naphthyl groups and the derivatives thereof in which each derivative group is selected from the class consisting of chloro, bromo, fluoro, cyano, alkyl, and phenyl groups, said alkyl, and phenyl derivative groups having no more than 8 carbon atoms, at least 5 percent by weight of said preformed polymer consisting of aromatic nuclei having at least 4 aromatic nuclear positions unsubstituted, with an acylating agent comprising the anhydride of an acid having a formula selected from the group consisting of $HOOC-C(R)=C(R)-COOH$; and, $$R'-CH=CH(R')-COOH$$

wherein one R is hydrogen and the other R is a radical selected from the class consisting of hydrogen, methyl, chloro and bromo radicals, and one R' is hydrogen and the other R' is $-CH_2-COOH$, said acylating being effected in the presence of $AlCl_3$ until at least 0.1 molar equivalents of said acylating agent have been attached to said aromatic nuclei per 100 aromatic nuclei in said preformed polymer.

2. The process of claim 1, in which said $AlCl_3$ is present in a molar proportion of at least 0.1 mole and no more than 2.5 moles per mole of said acylating agent.

3. The process of claim 1, in which said $AlCl_3$ is present in a proportion of approximately 2 moles per mole of said acylating agent.

4. The process of claim 1, in which said acylation is effected at a temperature no less than 0° C. and no higher than 80° C.

5. The process of claim 1, in which said acylation is effected at room temperature and ambient temperatures.

6. The process of claim 1, in which said acylating agent is maleic anhydride.

7. The process of claim 1, in which said acylating agent is glutaconic anhydride.

8. The process of claim 1, in which said acylating agent is itaconic anhydride.

9. The process of claim 1, in which said acylating agent is citraconic anhydride.

10. The process of claim 1, in which said acylating agent is α-chloro-maleic anhydride.

11. The process of claim 1, in which said acylating agent is α-bromo-maleic anhydride.

12. The process of claim 1, in which said alkenyl aromatic polymer is polymeric styrene.

13. The process of claim 12, in which said acylating agent is maleic anhydride.

14. The process of claim 12, in which said acylating agent is glutaconic anhydride.

15. The process of claim 12, in which said acylating agent is itaconic anhydride.

16. The process of claim 12, in which said acylating agent is citraconic anhydride.

17. The process of claim 12, in which said acylating agent is α-chloro-maleic anhydride.

18. The process of claim 12, in which said acylating agent is α-bromo-maleic anhydride.

19. The process of claim 1, in which said alkenyl aromatic preformed polymer is a homopolymer of styrene and said acylating agent is maleic anhydride.

20. A process of claim 1, in which said preformed polymer is a polymeric α-methyl-styrene.

21. A process of claim 20, in which said acylating agent is maleic anhydride.

22. A linear polymer having in the polymer chain thereof a plurality of aromatic repeating units having the formula

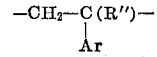

and also a plurality of carboxy ethylene keto repeating units having a formula selected from the class consisting of

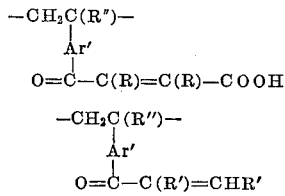

and

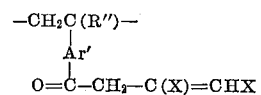

wherein one R is hydrogen and the other R is a radical selected from the class consisting of hydrogen, methyl, chloro and bromo radicals; one R' is hydrogen and the other R' is $-CH_2-COOH$; R'' is a radical selected from the class consisting of hydrogen, methyl and ethyl radicals; Ar is an aromatic group selected from the class consisting of phenyl and naphthyl groups and the derivatives thereof in which each derivative group is selected from the class consisting of chloro, bromo, fluoro, cyano, alkyl and phenyl groups, said alkyl derivative groups having no more than 8 carbon atoms; Ar' is an aromatic group similar to Ar except that it has a valency one greater than Ar; and one X is hydrogen and the other X is a COOH group, said carboxy ethylene repeating units being present in a molar equivalent proportion of at least 0.01 on the basis of each 100 aromatic nuclei in said polymer and no more than 25 percent by weight based on the total weight of said polymer, and any other repeating units present in said polymer molecule being those derived by polymerizing a comonomer selected from the class consisting of ethylene, propylene, butene, butadiene, isoprene, vinyl ethyl ether, acrylonitrile and methyl methacrylate, the amount of said any other repeating units being no more than 95 percent by weight of said polymer.

23. A polymeric composition of claim 22 in which said carboxy ethylene repeating units are present in a molar equivalent proportion of at least 5 on the basis of each 100 aromatic nuclei in said polymer and the amount of said any other repeating units being no more than 80 percent by weight of said polymer.

24. A polymeric composition of claim 22, in which said carboxy ethylene keto repeating units have the formula

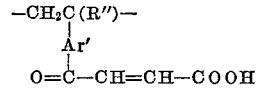

25. A polymeric composition of claim 22, in which said carboxy ethylene keto repeating units have a formula selected from the class consisting of

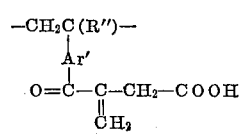

and

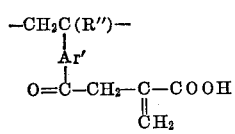

26. A polymeric composition of claim 22, in which said carboxy ethylene keto repeating units have a formula selected from the class consisting of

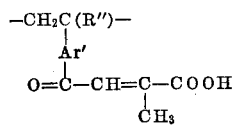

and

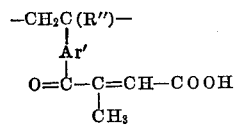

27. A polymeric composition of claim 22, in which said carboxy ethylene keto repeating units have a formula selected from the class consisting of

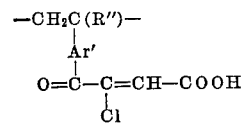

and

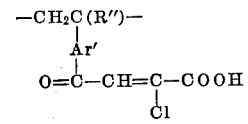

28. A polymeric composition of claim 22, in which said carboxy ethylene keto repeating units have a formula selected from the class consisting of

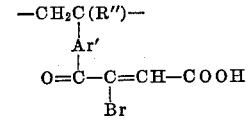

and

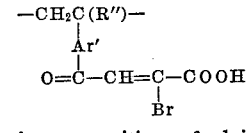

29. A polymeric composition of claim 22, in which said carboxy ethylene keto repeating units have a formula selected from the class consisting of

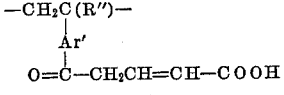

and

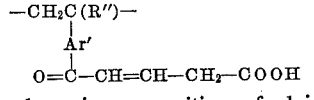

30. A polymeric composition of claim 22, in which said aromatic repeating units have the formula

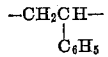

and said carboxy ethylene keto repeating units have the formula

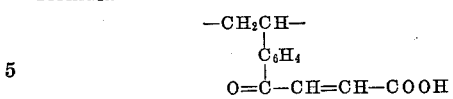

31. A polymeric composition of claim 22, in which said aromatic repeating units have the formula

and said carboxy ethylene keto repeating units have a formula selected from the class consisting of

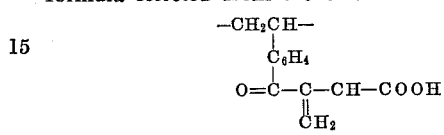

and

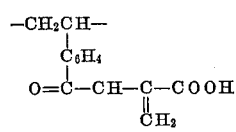

32. A polymeric composition of claim 22, in which said aromatic repeating units have the formula

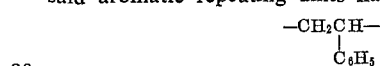

and said carboxy ethylene keto repeating units have a formula selected from the class consisting of

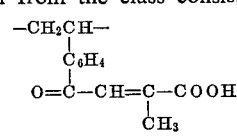

and

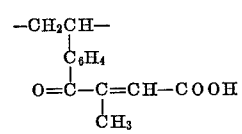

33. A polymeric composition of claim 22, in which said aromatic repeating units have the formula

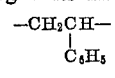

and said carboxy ethylene keto repeating units have a formula selected from the class consisting of

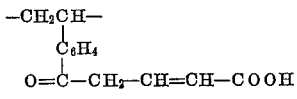

and

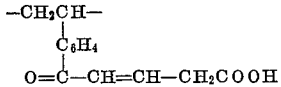

References Cited by the Examiner

UNITED STATES PATENTS

| | | | |
|---|---|---|---|
| 2,500,082 | 3/1950 | Liefer et al. | 260—93.5 |
| 2,915,511 | 12/1959 | Blanchette | 260—93.5 |
| 3,073,805 | 1/1963 | Reinhard | 260—78.5 |

JOSEPH L. SCHOFER, *Primary Examiner.*

DONALD E. CZAJA, *Examiner.*